(12) United States Patent
Li et al.

(10) Patent No.: US 6,299,787 B1
(45) Date of Patent: Oct. 9, 2001

(54) SURFACE MODIFICATION OF POLYMERS

(75) Inventors: Sheng Li, Wheelers Hill; Hans Jorg Griesser, The Patch, both of (AU)

(73) Assignee: Commonwealth Scientific and Industrial Research Organisation, Campbell (AU)

( * ) Notice: Subject to any disclaimer, the term of this patent is extended or adjusted under 35 U.S.C. 154(b) by 0 days.

(21) Appl. No.: 09/180,086

(22) PCT Filed: May 2, 1997

(86) PCT No.: PCT/AU97/00264

§ 371 Date: Dec. 2, 1998

§ 102(e) Date: Dec. 2, 1998

(87) PCT Pub. No.: WO97/42257

PCT Pub. Date: Nov. 13, 1997

(30) Foreign Application Priority Data

May 2, 1996 (AU) .................................................. PN9606

(51) Int. Cl.[7] .................................................. B32B 31/12
(52) U.S. Cl. .................. 216/34; 156/272.6; 427/536; 216/67
(58) Field of Search .................. 216/34, 67; 427/536, 427/569; 156/272.2

(56) References Cited

U.S. PATENT DOCUMENTS

| | | | |
|---|---|---|---|
| 5,093,151 | 3/1992 | van den Berg | 427/39 |
| 5,135,598 | * 8/1992 | Kobe et al. | 156/273.3 |
| 5,215,636 | 6/1993 | Danilychev | 204/164 |
| 5,449,383 | 9/1995 | Chatelier et al. | 623/1 |

FOREIGN PATENT DOCUMENTS

WO94/06485  3/1994 (WO).

OTHER PUBLICATIONS

Derwent Abstract No. 95–183065 relating to JP 07–102095, Nisshin Electrical Co. Ltd., Apr. 18, 1994.
Derwent Abstract No. 96–371391 relating to WO 96/23834, Schneider USA Inc. Aug. 8, 1996.
Abstract of JP 6220231 (Fukui Ken Prefecture and Kurabo Ind. Ltd.) Nov. 2, 1994.
Abstract of JP 05247198 (IBM Corp.) Jan. 11, 1994.
Abstract of JP 3164246 (Shinetsu Chem. Ind.) Sep. 28, 1993.
Abstract of JP 3064382 (Nippon Valqua Ind. Ltd. and Shinetsu Chem. Ind. Co. Ltd.) Sep. 28, 1993.
Abstract of DE 3406637 (Leybald—Heraeus GMB) Sep. 25, 1993).
N. Inayaki et al, J. Adhesion Sci. Technology, vol. 3, No. 8, pps. 637–649, Aug. 1989.
L. Siperko et al, J. Adhesion Sci. Technology, vol. 3, No. 3, pps. 157–173 Mar. 1989.
Kaplan et al, Surface and Interface Analysis, vol. 20, pps. 331–336, Dec., 1993.
Liston et al, J. Adhesion Sci. Technology, vol. 7, pps. 1091–1127, Jul. 1993.
Xie et al, J. Adhesion Sci. Technology, vol. 6, pps. 1411–1431, Jun. 1992.

* cited by examiner

*Primary Examiner*—Randy Gulakowski
*Assistant Examiner*—Allan Olsen
(74) *Attorney, Agent, or Firm*—Jacobson Holman, PLLC

(57) ABSTRACT

A method of providing adhesion to a fluorinated polymer including exposing at least a portion of the surface of the fluorinated polymer to plasma discharge in an atmosphere containing an organic amine.

16 Claims, 1 Drawing Sheet

SURFACE MODIFICATION OF POLYMERS

This invention relates to a method for improving the adhesion of materials to polymers including fluorinated polymers such as copolymers of ethylene and tetrafluoroethylene, and especially perfluorinated polymers such as the polytetrafluoroethylene (PTFE), perfluorinated ethylene-propylene polymers FEP, tetrafluoroethylene-ethylene copolymers (PFE-ET), hexafluoropropylene polymers (HFP) or fluorovinylether polymers also known as perfluroalkoxy polymer (PFA).

BACKGROUND TO THE INVENTION

Fluorinated polymers have a unique position in the plastics industry due to their chemical inertness, heat resistance, electrical insulation, low coefficient of friction and water repellancy. Notwithstanding the enormous advantages of fluorinated polymers their inert chemical nature, especially of perfluorinated polymers, makes them extremely hard to bond with adhesives. Fluoropolymers are not amenable to the usual surface modification techniques that have enabled adhesive bonding of hydrocarbon polymers. Surface treatments such as corona discharge and flame treatment, which are well known in the art for introducing bondable polar groups to the surface layers of, for example, polyolefins are ineffective with fluorinated polymers.

The presence of fluorine seems to markedly affect the chemical reactions occurring in polymer surface layers upon surface treatments. It is known that oxygen-containing or nitrogen-containing groups can be incorporated into the surface of, for instance, PTFE (Liston et al., *Journal of Adhesion Science and Technology*, 7, (1993)) and FEP (Xie et al., *Journal of Adhesion Science and Technology*, 6 , 1411 (1993)) and the modified surfaces can be wetted, but adhesion is nevertheless poor. This poor adhesion has been attributed to a weak sub-surface structure of PTFE (Liston et al., *Journal of Adhesion Science and Technology*, 7, (1993)). Moreover the effects of ammonia plasma treatment are greatly reduced over a period of a few days due to surface layer motability (Xie et al).

The surface layers of perfluorinated polymers can be modified also by exposure to an etching solution that contains sodium naphthalene complex. PTFE surfaces etched thus can be adhesively bonded. The "sodium etch" method suffers, however, from considerable disadvantages. The high reactivity of the etch solution makes it dangerous to handle, requiring cumbersome precautions, and causes substantial disposal problems.

Attempts have been made to modify perfluorinated polymers by surface treatment methods such as corona discharge, flame treatment, and low pressure gas plasma (glow discharge) treatments, which pose far lower environmental hazards and are well established. The former two treatments are oxidative in nature and have not given satisfactory bond strengths. Low pressure plasma methods are more versatile in the choice of gas and enable introduction of various chemical groups onto polymer surfaces. However, in spite of many studies on, for instance, the introduction onto PTFE surfaces of amine groups to enable covalent adhesive bonding with cyanoacrylate or epoxy adhesives, no satisfactory process has been found; the bond strength was always found to be considerably below the cohesive strength of the material.

To improve subsequent adhesion perfluorinated polymers have been glow discharge treated in hydrogen/nitrogen mixtures (JP-A-6220231) (etching), in silane (JP-A-3164246), fluorocarbons or chlorfluorocarbons (DE-A-3408837) and in Ar, $N_2$, $O_2$, He or air (JP-A-3064382). Surface modification of PTFE by ammonia plasma treatment and its effect on bonding to nitrile rubber using a phenol-type adhesive was reported by Inagaki et al in J Adhesion Sci Technol Vol 3, no. 8, pp 637–649 (1989). PTFE strips were given a ten minute treatment in a continuous 20 kHz 150 mA plasma in 26Pa $NH_3$ atmosphere at various sample temperatures; only when the sample temperature reached over 200° C. were bonds of strength exceeding the cohesive strength of the PTFE formed.

SUMMARY OF INVENTION

We have discovered that the use of organic amine vapours in the plasma discharge treatment of fluorinated polymers offers significant improvements in the adhesive bond strength compared with the ammonia plasma treatments described in the prior art.

Accordingly in one aspect the invention provides a method of providing adhesion to fluorinated polymers including exposing at least a portion of the surface of the fluorinated polymer to a plasma discharge in an atmosphere containing an organic amine. The surface of the fluorinated polymer may then be bonded to another material by contacting the surface with a suitable adhesive.

The organic amine used in the surface modification procedure may for example, be a hydrocarbyl amine comprising one or more amino group, a dihydrocarbyl amine or a polyhydrocarbylene polyamine.

When the organic amine is a hydrocarbyl amine or dihydrocarbyl amine the hydrocarbyl group may be branched, straight chain, cyclic-aliphatic or aromatic. Preferred hydrocarbyl are selected from the group consisting of alkyl, cycloalkyl, alkene and aryl. Aliphatic hydrocarbyl are more preferred.

The particularly preferred organic amines contain from one to twelve carbon atoms, more preferably from one to ten.

Specific examples of preferred hydrocarbyl amines and dihydrocarbylamines include methylamine, ethylamine, propylamine, butylamine, pentylamine, hexylamine, heptylamine, allylamine, 1,3-diaminopropane, diamino butane, cyclopentylamine, diisopropylamine, diaminocyclohexane and aniline.

Specific examples preferred polyhydrocarbylene polyamines include diethylenetriamine and triethylenetetramine.

Examples of adhesives which may be used in the process of the invention include cyanoacrylates, epoxy adhesives, structural acrylic adhesives, polyurethane adhesives, silicone adhesives, unsaturated polyester adhesives, contact adhesives or thermoplastic adhesives. The preferred adhesive chosen will depend on the nature of the material to be bonded to the polymer and the intended application of the assembly.

The method of this invention provides an effective pre-treatment for achieving strong adhesive bonding. It has minimal environmental impact, and utilises equipment whose commercial use is established. We have found that the method of the invention typically allows an adhesive bond strength to be achieved which is equal to the cohesive strength of the material. Furthermore unlike ammonia plasma treatment of fluoropolymer surfaces the present invention provides a long lasting improvement in bondability of the fluoropolymer surface. This provides an extended shelf life between treatment and bonding.

The invention also provides a fluoropolymer having an enhanced ability to bond to adhesives. Accordingly, in a further aspect the invention provides a fluorinated polymer the surface of which is bonded to a substrate with an adhesive and wherein the surface of the fluoropolymer has been treated with plasma discharge in the presence of an atmosphere containing an organic amine.

In another aspect the invention provides a composite comprising a first article having a surface of fluoropolymer which has been modified according to the above described method of the invention and a second article which has been bonded to the first article by an adhesive disposed between the second article and the modified fluoropolymer surface. The composite may contain two or more components and each may for example be formed of plastic which may optionally be reinforced, ceramic or metal.

The fluoropolymer surface treated by the method may be a portion of the surface area. For example where only part of an article is to be bonded the plasma discharge may be localised to all or part of the area to be bonded. The fluropolymer surface may be part of a film, foil, sheet or rod or can be in any other form such as a complex shape, component or composite.

We have also found that the intermittent operation of the plasma discharge provides an unexpected advantage in increasing the adhesive bond strength when compared with corresponding treatments without intermittent operation. The invention therefore further provides a method for the treatment of a polymer surface, preferably a fluoropolymer or polyolefin surface, to increase the adhesive bonding strength thereto the method comprising exposing the surface to a vapour composition including at least one surface modifying agent and subjecting the surface to plasma discharge and wherein the polymer surface is subject to plasma discharge intermittently.

The polymer surface may be intermittently subjected to plasma discharge in a number of ways. In one method the polymer being treated is stationary in a plasma chamber in the appropriate atmosphere and the potential applied to the electrodes is cycled so that the plasma is alternately ignited and extinguished. In another method the polymer is repeatedly moved into and out of a single plasma discharge zone. Intermittent plasma treatment may also be achieved on a continuous production line by passing the polymer to be treated through a series of physically separated plasma discharge zones; in this case the ratio of plasma treatment time to no-discharge time is determined by the physical dimensions of the apparatus and the rate of transfer between discharge zones.

The polymer is typically intermittently subjected to plasma discharge with exposure periods of from 0.1 to 30 seconds. The time period between successive exposures is preferably in the range of from 0.1 seconds to 10 minutes. Typically the most preferred period between successive exposures to plasma discharge is from 0.1 to 30 seconds.

We have found that by using intermittent operation the bond strength for a given total plasma energy is significantly increased.

The benefits of intermittent plasma application are provided for a range of modifying vapours, and substrates. For example the vapour may be ammonia, water vapour, alcohols, amines or amides when the substrate is other than fluoropolymer.

The use of an intermittent discharge in modifying the surface of fluoropolymers using an organic amine vapour provides particularly good adhesion and can give rise to significant energy savings.

The improved bond strength provided by the process of the invention enables fluoropolymers to be more efficiently used in a range of applications. PTFE may be bonded as a facing to plastic or metal parts to take advantage of the low friction properties, the electrical insulating properties or resistance to corrosive chemicals.

The invention may use known low pressure plasma equipment modified to provide an atmosphere of the organic amine in the region of the plasma discharge.

The method of the invention may utilise additional components or steps. For example gases such as inert gases or organic ammonia may be used in combination with the organic amine. Accordingly throughout the description and claims of this specification, the word "comprise" and variations of the word, such as "comprising" and "comprises", is not intended to exclude other additives or components or steps.

A suitable plasma discharge apparatus is shown in the drawings.

Figure 1:
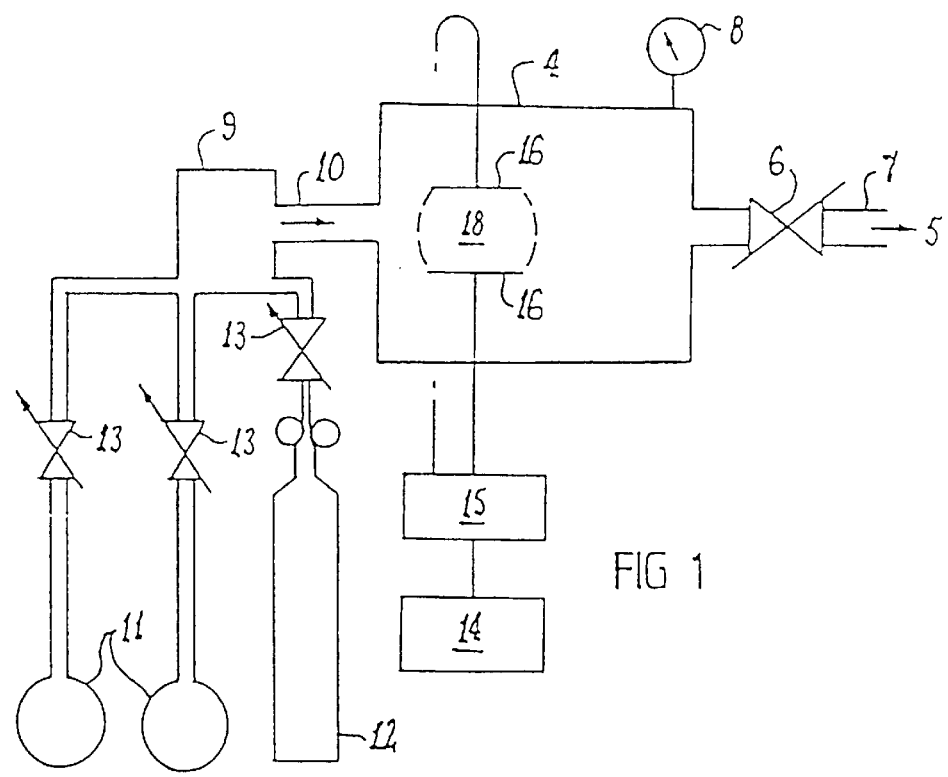
FIG. 1 shows schematically a typical low pressure gas plasma setup suitable for the execution of the present invention.
Figure 1A:
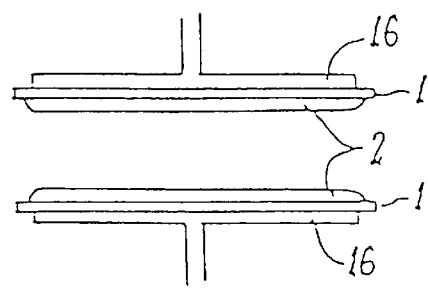
Figure 1B:
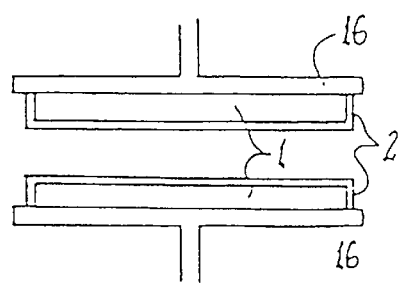
Figure 1C:
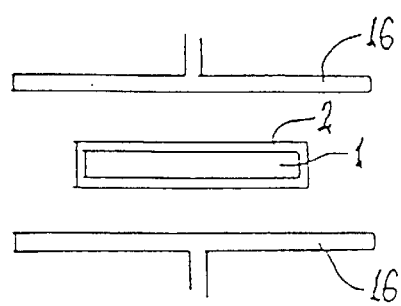
Figure 1D:
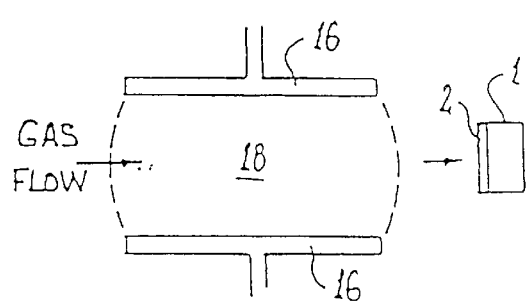

The low pressure gas plasma set up of FIG. 1 is described in U.S. Pat. No. 5,449,383 which is herein incorporated by reference.

FIG. 1 is a schematic view showing the parts of a plasma apparatus 3 for performing the process of this invention. A vacuum chamber 4 is evacuated by a pumping system 5 connected by an adjustable throttle valve 6 and an exhaust pipe 7. The pressure in the chamber is monitored by a pressure gauge 8. Vapour and gas streams are supplied to a mixing device 9 and reach the vacuum chamber 4 via an inlet pipe 10. Preferably, pressures of 0.1–1.0 torr are used.

Organic amine liquids are stored in thermostatted containers 11. Evaporation by boil off supplies organic amine vapour. Inorganic gases, such as ammonia and/or inert gases such as argon may be supplied from cylinders 12. All streams are individually controlled by flow control equipment 13 prior to reaching the mixing device 9. All streams may be used singly or in any combination.

High frequency electric power is provided by a source 14 via a matching network 15 to the electrodes 16. On application of electric power a discharge is established in the discharge zone 18 between the electrodes and as a result, the vapour becomes activated. From the gas plasma the activated products of organic amine or amines are polymerised as a thin layer 2 on to one or multiple surfaces of the bulk polymeric material 1.

Preferably the invention will utilise plasmas operating at frequencies of from 50 HZ to 100 GHZ at pressures of 0.01 to 10 Torr (more preferably 0.1 to 1 Torr). The total plasma power load per sample may be in the range of from $10^{-4}$ W per $cm^2$ to 1000 W per $cm^2$.

The invention will now be described in greater detail in conjunction with specific examples. It will be appreciated that the following examples are provided for the purposes of illustrating the invention and in no way should they be seen as limiting the scope of the above invention.

EXAMPLES

In the following examples the surface of a range of substrates was treated by exposure to various plasma procedures and pairs of treated substrates bonded with cyanoacrylate adhesive. Tensile single-lap-shear tests were performed in dry condition according to ASTM D3165-73, except that lap shear coupons were of dimensions 50×25×3 mm (length x width x thickness) and the overlap was 25×3 mm. After bonding, the specimens were allowed to cure for 72 hours at room temperature in air prior to mechanical testing. Tests of bonded specimens were carried out on an Instron testing machine at room temperature in air 21±2° C.; relative humidity=50±5%), at a crosshead speed of 0.1 cm/min. A minimum of three specimens was tested in each case.

Example 1
Effect of Plasma Gas

In this example the surface of PTFE coupons were modified by various plasmas in the plasma reactor illustrated in FIG. 1. After plasma surface modification, the coupons were bonded with cyanoacrylate adhesive (LOCTITE 406). The treatment conditions and bond strengths are summarised in Table 1.

The surface modifications were:
i) no treatment;
ii) ammonia plasma treatment operated at 175 kHz, 0.5 torr and 25 watts and at various duration;
iii) plasma polymerisation of n-butylamine performed at 175 kHz, 0.3 torr and at various energy levels and treatment durations;
iv) plasma polymerisation of 1,3 diaminopropane (DAP) done at 175 kHz, 0.3 torr, 20 watts and various treatment durations.

TABLE 1

Lap shear strength of PTFE modified by various plasmas

| Test Number | Plasma Type | Dissipated Energy (Watts) | Duration Seconds) | Lap Shear Strength (MPa) |
|---|---|---|---|---|
| 1 | no treatment | | | 0.2 ± 0.2 |
| 2 | NH$_3$ | 25 | 40 | 2.3 ± 0.3 |
| 3 | NH$_3$ | 25 | 60 | 2.7 ± 0.5 |
| 4 | NH$_3$ | 25 | 120 | 3.4 ± 0.5 |
| 5 | NH$_3$ | 25 | 240 | 4.1 ± 0.2 |
| 6 | n-Butylamine | 25 | 20 | 4.9 ± 1.0 |
| 7 | n-Butylamine | 25 | 40 | 6.3 ± 0.8 |
| 8 | n-Butylamine | 10 | 100 | 6.4 ± 0.3 |
| 9 | n-Butylamine | 25 | 60 | 6.7 ± 0.2 |
| 10 | n-Butylamine | 35 | 40 | 5.9 ± 0.2 |
| 11 | n-Butylamine | 50 | 60 | 5.8 ± 0.1 |
| 12 | DAP | 20 | 5 | 7.1 ± 0.8 |
| 13 | DAP | 20 | 10 | 8.3 ± 0.3 |
| 14 | DAP | 20 | 20 | 8.2 ± 0.4 |

As can be seen from specimen 1 of Table 1, untreated PTFE has very poor bonding. Ammonia plasma treatment improves the bonding strength but lap shear strength at optimal conditions ranges around 3 to 4 MPa. These values have been documented in the paper by Liston et al referred to above and are claimed to be unsuitable for industrial applications in the article by Inagaki referred to above. Plasma deposition according this invention with n-butylamine or 1,3-diamino propane improves significantly the adhesion properties of PTFE. Compared to ammonia plasma the lap shear strength obtained with n-butylamine plasma polymerisation is 50% greater and with 1,3 diaminopropane more than 100% greater.

Example 2
Effect of Power Application Mode

This example shows the bonding properties of PTFE modified by plasma polymerisation of alkylamine using continuous or intermittent power mode, PTFE coupons were surface modified by these plasmas then bonded with cyanoacrylate adhesive (LOCTITE 406). Lap shear test was performed according to the method described in Example 1. Results obtained on specimens tested are summarised in Table 2.

The surface surface modifications were:
i) plasma polymerisation of n-butylamine under continuous mode at 175 kHz, 0.3 torr and different energy levels and treatment durations;
ii) plasma polymerisation of n-butylamine under intermittent plasma mode at 175 kHz, 0.3 torr and different energy levels and treatment durations. For this plasma mode, plasma generator was turned on at operating pressure and then turned off at wanted treatment duration. The plasma chamber was pumped down to less than 0.05 torr then adjusted to the operating pressure. Another cycle of plasma polymerisation was carried out;
iii) plasma polymerisation of 1,3 diamino propane under continuous mode at 175 kHz and 0.3 torr;
iv) plasma polymerisation of 1,3 diaminopropane under intermittent plasma mode at 175 kHz and 0.3 torr.

TABLE 2

Lap shear strength of PTFE modified by continuous or intermittent plasma polymerisation of n-butylamine and 1,3 diaminopropane.

| Test No. | Monomer | Plasma Mode | Dissipated Energy (Watts) | Duration (cycle x time (sec)) | Total duration (seconds) | Lap shear strength (MPa) |
|---|---|---|---|---|---|---|
| 16 | n-Butylamine | Continuous | 10 | 1 × 100 | 100 | 6.4 ± 0.3 |
| 17 | n-Butylamine | Continuous | 25 | 1 × 60 | 60 | 6.7 ± 0.2 |
| 18 | n-Butylamine | Continuous | 35 | 1 × 40 | 40 | 5.9 ± 0.2 |
| 19 | n-Butylamine | Intermittent | 10 | 5 × 25 | 125 | 9.9 ± 0.4* |
| 20 | n-Butylamine | Intermittent | 25 | 6 × 10 | 60 | 9.8 ± 0.4* |
| 21 | n-Butylamine | Intermittent | 35 | 5 × 10 | 50 | 10.8 ± 0.8* |
| 22 | n-Butylamine | Intermittent | 50 | 5 × 6 | 30 | 9.2 ± 0.6* |
| 23 | n-Butylamine | Intermittent | 70 | 4 × 8 | 32 | 9.2 ± 0.3* |
| 24 | DAP | Continuous | 20 | 1 × 20 | 20 | 8.2 ± 0.4 |
| 25 | DAP | Intermittent | 20 | 3 × 4 | 12 | 9.0 ± 0.4* |

*Failure occurred in the substrate.

As can be seen from this table, at similar total treatment duration significant improvement in adhesion is achieved when plasma polymerisation with alkylamine is carried out under intermittent rather than continuous mode. The lap shear strength of PTFE modified by intermittent plasma of both n-butylamine and 1,3 diaminopropane exceeds 9 Mpa leading to deformation and cohesive failure of the fluoropolymer substrate.

Example 3

This example illustrates the application of intermittent plasma polymerisation of alkylamine on other type of polymers. High density polyethylene (HDPE) and polypropylene (PP) were subjected to surface modifications with n-butylamine plasma polymer obtained under continuous or Intermittent plasma mode and bonded with cyanoacrylate adhesive (LOCTITE 406). The lap shear strength of specimens tested is summarised in Table 3.

The surface modifications were:
i) no treatment
ii) plasma polymerisation of n-butylamine under continuous mode at 175 kHz, 0.3 torr and dissipated energy of 25 watts;
iii) plasma polymerisation of n-butylamine under intermittent plasma mode at 175 kHz, 0.3 torr and dissipated energy of 25 watts.

TABLE 3

Lap shear strength of high density polyethylene and polypropylene surface modified by n-butylamine plasma polymerisation performed under continuous or Intermittent plasma mode.

| Test No. | Substrate | Plasma Mode | Duration (cycle × time, seconds) | Total duration (seconds) | Lap shear strength (MPa) |
|---|---|---|---|---|---|
| 26 | HDPE | no treatment | | | 0.5 ± 0.3 |
| 27 | HDPE | Continuous | 1 × 60 | 60 | 10.9 ± 0.5 |
| 28 | HDPE | Intermittent | 3 × 20 | 60 | 19.5 ± 0.6* |
| 29 | HDPE | Intermittent | 6 × 10 | 60 | 19.7 ± 0.6* |
| 30 | PP | no treatment | | | 0.5 ± 0.3 |
| 31 | PP | Continuous | 1 × 60 | 60 | 7.0 ± 1.4 |
| 32 | PP | Intermittent | 3 × 20 | 60 | 12.0 ± 1.1 |
| 33 | PP | Intermittent | 5 × 10 | 50 | 18.2 ± 0.3* |

*Failure occurred in the substrate

It can be seen from Table 3, although significant improvement of bonding strength is achieved by surface modification of continuous plasma polymerisation of n-butylamine, the adhesion performance is better when the plasma is operated intermittently at similar conditions. Failure occurred within the polymer substrates for specimens modified under intermittent plasma.

Example 4

This example compares the bonding performance of PTFE surface treated by ammonia plasma under continuous mode or the Intermittent plasma. PTFE coupons were treated by ammonia plasma and bonded with cyanoacrylate adhesive (LOCTITE 406). The lap shear strength of bonded specimens is reported in Table 4.

The surface: treatments were:
i) ammonia plasma treatment operated under continuous mode at 175 kHz, 0.5 torr and dissipated energy of 25 watts;
ii) ammonia plasma treatment operated under intermittent mode at 175 kHz, 0.5 torr and dissipated energy of 25 watts.

TABLE 4

Lap shear strength of PTFE surface treated by ammonia plasma under continuous or Intermittent plasma mode and bonded with cyanoacrylate adhesive

| Specimen No. | Plasma Mode | Duration (cycle × time, seconds) | Total duration (seconds) | Lap Shear Strength (MPa) |
|---|---|---|---|---|
| 34 | Continuous | 1 × 20 | 20 | 2.1 ± 0.6 |
| 35 | Intermittent | 2 × 10 | 20 | 4.5 ± 0.5 |
| 36 | Continuous | 1 × 40 | 40 | 2.3 ± 0.3* |
| 37 | Intermittent | 4 × 10 | 40 | 4.5 ± 1.0* |
| 38 | Continuous | 1 × 60 | 60 | 2.7 ± 0.5 |
| 39 | Intermittent | 6 × 10 | 60 | 4.4 ± 0.8 |

From Table 4, it can be seen ammonia plasma treatment operated in intermittent mode provides better bonding strength than continuous mode. Lap shear strength is higher both at similar operating conditions and at optimal conditions for intermittent plasma treatment.

Exammple 5

This example demonstrates the bonding of PTFE modified according to the invention with epoxy adhesive. After exposure to butylamine plasma (n-butylamine plasma under intermittent plasma mode at 175 kHz, 0.3 torr, 35 watts and other conditions specified in Table 5), PTFE coupons were bonded with an epoxy adhesive (Araldite 138). Untreated control coupons were also bonded using the same adhesive. The bonded specimens were subjected to the lap shear test according to the method described in Example 1. Results obtained on treated and untreated specimens are summarised in Table 5.

TABLE 5

Lap shear strength of PTFE modified by intermittent plasma polymerisation of n-butylamine

| Test No. | Substrate | Plasma Mode | Duration (cycle × time, seconds) | Total duration (seconds) | Lap shear strength (MPa) |
|---|---|---|---|---|---|
| 40 | PTFE | no treatment | | | 0.3 ± 0.3 |
| 41 | PTFE | n-butylamine | 3 × 10 | 30 | 5.6 ± 0.5 |

Finally, it is to be understood that various other modifications and/or alterations may be made without departing from the spirit of the present invention as outlined herein.

What is claimed is:

1. A method of providing adhesion of an article to a fluorinated polymer surface which comprises intermittently subjecting at least a portion of the fluorinated polymer surface to from 0.1 to 30 seconds of plasma discharge in an atmosphere containing an organic amine to provide a modified fluoropolymer surface and bonding the modified fluoropolymer surface with the article by means of an adhesive disposed therebetween.

2. The method according to claim 1, wherein the organic amine comprises one or more compounds selected from the group consisting of a hydrocarbyl amine comprising one or more amino groups, a dihydrocarbyl amine and a polyhydrocarbylene polyamine.

3. The method according to claim 1, wherein the organic amine comprises a hydrocarbyl amine and a dihydrocarbyl amine with hydrocarbyl groups that are independently selected from the group consisting of alkyl, cycloalkyl, alkene and aryl.

4. The method according to claim 1, wherein the organic amine comprise from 1 to 10 carbon atoms.

5. The method according to claim 1, wherein the organic amine comprises one or more compounds selected from the group consisting of methylamine, ethylamine, propylamine, butylamine, pentylamine, hexylamine, heptylamine, cyclobutylamine, cyclopentylamine, allylamine, diisopropylamine, 1,3-diaminopropane, diamino-butane, diaminocyclohexane and aniline.

6. The method according to claim 1, wherein the adhesive is selected from the group consisting of a cyanoacrylate, an epoxy adhesive, an acrylic adhesive, a polyurethane adhesive, a silicone adhesive, an unsaturated polyester adhesive, a contact adhesive and a thermoplastic adhesive.

7. The method according to claim 1, wherein the adhesive is a cyanoacrylate adhesive.

8. The method according to claim 1, wherein the fluorinated polymer is a perfluorinated polymer selected from the group consisting of polytetrafluoroethylene (PTFE), a perfluorinated ethylene-propylene polymer (FEP), a tetrafluorethylene-ethylene copolymer, a hexafluoropropylene polymer (HFP) and a fluorovinylether polymer.

9. The method according to claim 1, wherein the fluorinated polymer is PTFE.

10. The method according to claim 1, wherein the plasma is operated at a frequency of from 50 HZ to 100 GHZ and pressures of 0.01 to 10 Torr.

11. An article comprising a surface of fluoropolymer wherein at least a portion of the fluoropolymer surface has been modified by intermittently subjecting it to from 0.1 to 30 seconds of plasma discharge in an atmosphere containing an organic amine.

12. The composite comprising a first article according to claim 11 and which further comprises a second article which is bonded to the first article by an adhesive disposed between the second article and the modified fluoropolymer surface.

13. A method of providing adhesion of an article to a fluorinated polymer surface which comprises repeatedly moving at least a portion of the fluorinated polymer surface into and out of a plasma discharge zone in an atmosphere containing an organic amine to provide a modified fluoropolymer surface and bonding the modified fluoropolymer surface with the article by means of an adhesive disposed therebetween.

14. A composite comprising a first article having a surface of fluoropolymer which has been modified by repeatedly moving at least a portion of the surface into and out of a plasma discharge zone in an atmosphere containing an organic amine and which further comprises a second article which is bonded to the first article by an adhesive disposed between the second article and the modified fluoropolymer surface.

15. A method of providing adhesion of an article to a fluorinated polymer surface which comprises passing at least a portion of the fluorinated polymer surface through a series of spaced plasma discharge zones in an atmosphere containing an organic amine to provide a modified fluoropolymer surface and bonding the modified fluoropolymer surface with the article by means of an adhesive disposed therebetween.

16. A composite comprising a first article having a surface of fluoropolymer which has been modified by passing at least a portion of the surface through a series of spaced plasma discharge zones in an atmosphere containing an organic amine and which further comprises a second article which is bonded to the first article by an adhesive disposed between the second article and the modified fluoropolymer surface.

* * * * *